United States Patent
Nguyen

(10) Patent No.: US 10,922,586 B2
(45) Date of Patent: Feb. 16, 2021

(54) AUTOMATIC TARGET RECOGNITION WITH REINFORCEMENT LEARNING

(71) Applicant: The Boeing Company, Chicago, IL (US)

(72) Inventor: Hieu T. Nguyen, Madison, AL (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 16/357,958

(22) Filed: Mar. 19, 2019

(65) Prior Publication Data

US 2020/0302238 A1   Sep. 24, 2020

(51) Int. Cl.
*G06K 9/00* (2006.01)
*G06K 9/62* (2006.01)

(52) U.S. Cl.
CPC ......... *G06K 9/6262* (2013.01); *G06K 9/6215* (2013.01); *G06K 9/6254* (2013.01); *G06K 2209/21* (2013.01)

(58) Field of Classification Search
None
See application file for complete search history.

(56) References Cited

U.S. PATENT DOCUMENTS 10,037,471 B2 *  7/2018  Satzoda ............... G06K 9/6223
10,152,641 B2 * 12/2018  Amico ............... G06K 9/00832
10,671,893 B2 *  6/2020  Lee .................... G16H 20/60

OTHER PUBLICATIONS

Papadopoulos et al., "We don't need no bounding boxes: training object class detectors using only human verification", CVPR Feb. 2016 (Year: 2016).*
Bechar, A. and Y. Edan. Human-robot collaboration for improved target recognition of agricultural robots. Industrial Robot 30(5): pp. 432-436, 2003.
K. Konyushkova, J.R.R. Uijlings, C. Lampert, and V. Ferrari. Learning Intelligent Dialogs for Bounding Box Annotation. In Proceedings of the IEEE conf. on CVPR 2018.
Pacaux-Lemoine, M.-P., Debernard, S., Godin, A., Rajaonah, B., Anceaux, F., Vanderhaegen, F.: Levels of Automation and human-machine cooperation: application to human-robot interaction. In: IFAC World Congress, pp. 6484-6492 (2011).
Sheridan, T. B. Human-robot Interaction: Status and challenges. Human Factors, 58(4), pp. 525-532., 2016.

* cited by examiner

*Primary Examiner* — Soo Jin Park
(74) *Attorney, Agent, or Firm* — Womble Bond Dickinson (US) LLP

(57) ABSTRACT

An apparatus for automatic target recognition with reinforcement learning is provided. The apparatus receives an image of a scene and performs an automatic target recognition on the image to detect objects in the image as candidate targets. The apparatus divides the candidate targets into subsets of candidate targets and performs a verification of the automatic target recognition to identify true targets in the image. In the verification, the apparatus solicits user input to manually identify some true targets in the image. The verification is performed according to a reinforcement learning process to minimize a total verification time.

21 Claims, 7 Drawing Sheets

US 10,922,586 B2

AUTOMATIC TARGET RECOGNITION WITH REINFORCEMENT LEARNING

TECHNOLOGICAL FIELD

The present disclosure relates generally to object recognition, and in particular, to automatic target detection with reinforcement learning.

BACKGROUND

A number of technologies rely on the recognition of objects in images or video, and either the nature of the technology, or number or size of the images or video make it an impractical task for a human. Object recognition is a computer technology for recognizing objects in images or video, and has a wide variety of applications. Automatic target recognition (ATR) is a particular object-recognition technique for recognizing targets or objects of interest. In object recognition and in particular in ATR, high accuracy is generally desired, and at times difficult to achieve.

Many underwater mine countermeasure (MCM) tasks involve the recognition of mines in sonar images, and the amount of sonar image data is often large enough to make human recognition alone impractical. ATR systems can automatically recognize mines from a large amount of sonar image data within a desired time period. However, many ATR systems alone cannot guarantee 100% accuracy in recognizing all mines, and in that all recognized mines are true mines. The same is generally true for ATR systems in recognizing targets or other objects of interest, particularly in applications involving large amounts of image or video data.

Therefore, it would be desirable to have a system and method that takes into account at least some of the issues discussed above, as well as other possible issues.

BRIEF SUMMARY

Example implementations of the present disclosure are directed to target detection with reinforcement learning. Example implementations of the present disclosure can use reinforcement learning to learn the best strategy or policy of using an ATR system to minimize a total verification time in target detection. Comparing to some existing approaches, example implementations of the present disclosure can provide a user with more options of using the ATR system. Example implementations of the present disclosure can provide the ability of learning an optimal strategy of using the ATR system. Example implementations of the present disclosure can guarantee a high accuracy (e.g., close or equal to 100% accuracy) of target detection while requiring significantly less time than manual detection. Example implementations of the present disclosure have no restriction on the number of targets per image.

The present disclosure thus includes, without limitation, the following example implementations.

Some example implementations provide a method of automatic target recognition with reinforcement learning, comprising: receiving an image of a scene;

performing an automatic target recognition on the image to detect objects in the image as candidate targets; dividing the candidate targets into subsets of candidate targets; performing a verification of the automatic target recognition to identify true targets in the image, including: presenting the image in a graphical user interface (GUI), in which one subset at a time is indicated on the image, sequentially beginning with and including at least a first subset of the subsets of candidate targets; receiving user input via the GUI for at least the first subset to verify those of the candidate targets in at least the first subset that are true targets; and soliciting user input to manually identify remaining true targets in the image, wherein the verification is performed according to a reinforcement learning process including an agent to interact with an environment of the GUI and user input in discrete steps, in each of the discrete steps the agent configured to choose a first action to present the image in the GUI in which a current one of the subsets is identified, for receipt of user input via the GUI to verify those of the candidate targets in the current one of the subsets that are true targets, or a second action to solicit the user input to manually identify the remaining true targets in the image, a reward at each of the discrete steps defined by a negative time for the first action or the second action chosen.

In some example implementations of the method of any preceding example implementation, or any combination of preceding example implementations, performing the automatic target recognition further includes classifying the objects as the candidate targets with respective classifications, and soliciting user input to manually identify the remaining true targets in the image includes soliciting further user input to classify the remaining true targets.

In some example implementations of the method of any preceding example implementation, or any combination of preceding example implementations, performing the automatic target recognition includes detecting the objects in the image as the candidate targets with respective confidence scores, and dividing the candidate targets includes dividing the candidate targets into the subsets of candidate targets corresponding to different ranges of the confidence scores, the first subset having a highest of the different ranges of the confidence scores.

In some example implementations of the method of any preceding example implementation, or any combination of preceding example implementations, performing the automatic target recognition includes detecting the objects in the image as the candidate targets using deep learning.

In some example implementations of the method of any preceding example implementation, or any combination of preceding example implementations, receiving user input further includes removing from at least the first subset, those of the candidate targets in at least the first subset that are not true targets.

In some example implementations of the method of any preceding example implementation, or any combination of preceding example implementations, the reinforcement learning process includes a Q-learning process, and the verification is performed using the Q-learning process to minimize the total verification time.

In some example implementations of the method of any preceding example implementation, or any combination of preceding example implementations, performing the automatic target recognition and verification enables identification of all the true targets in the image.

Some example implementations provide an apparatus for automatic target recognition with reinforcement learning. The apparatus comprises a processor and a memory storing executable instructions that, in response to execution by the processor, cause the apparatus to at least perform the method of any preceding example implementation, or any combination of any preceding example implementations.

Some example implementations provide a computer-readable storage medium for automatic target recognition with reinforcement learning. The computer-readable storage medium is non-transitory and has computer-readable program code stored therein that in response to execution by a processor, causes an apparatus to at least perform the method of any preceding example implementation, or any combination thereof.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
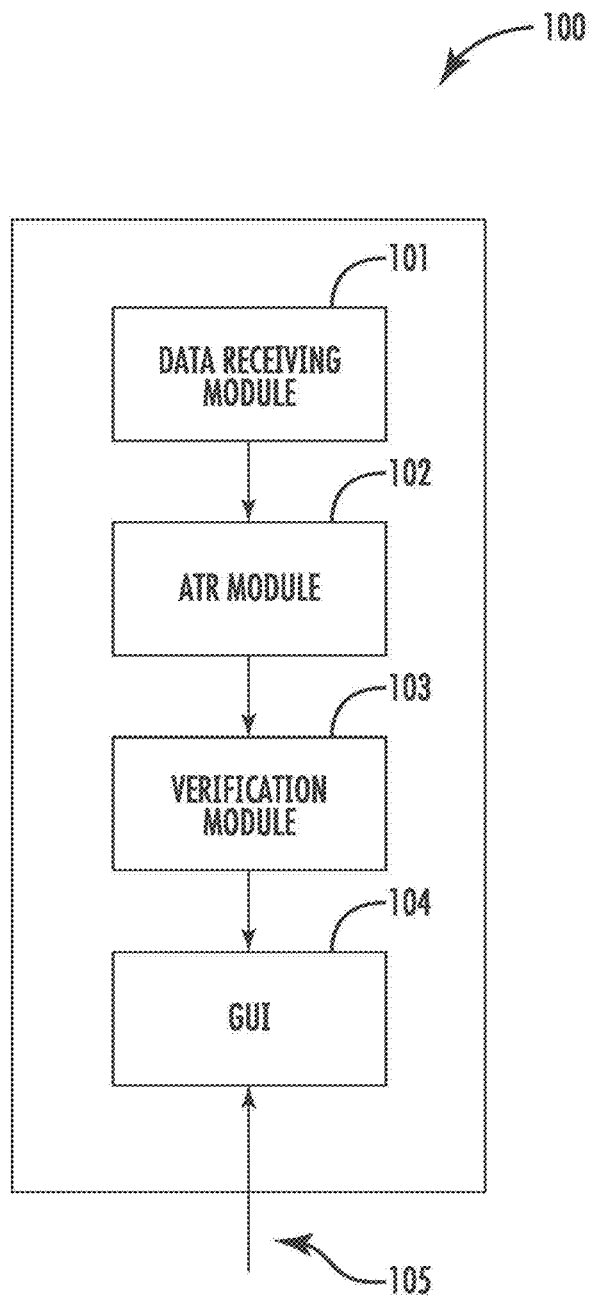
FIG. 1 illustrates a system for automatic target recognition with reinforcement learning, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to object recognition, and in particular, to automatic target detection with reinforcement learning.

FIG. 1 illustrates a system 100 for automatic target recognition (ATR) with reinforcement learning, according to example implementations of the present disclosure. In some examples, as described in greater detail with reference to FIG. 4, the system may be implemented by an apparatus for ATR with reinforcement learning.

The system 100 includes any of a number of different subsystems (each an individual system) for performing one or more functions or operations. As shown, in some examples, the system includes one or more of each of a data receiving module 101, an ATR module 102, a verification module 103 and a graphical user interface (GUI) 104. The subsystems may be co-located or directly coupled to one another, or in some examples, various ones of the subsystems may communicate with one another across one or more computer networks. Further, although shown as part of the system, it should be understood that any one or more of the data receiving module, ATR module, verification module and GUI may function or operate as a separate system without regard to any of the other subsystems. It should also be understood that the system may include one or more additional or alternative subsystems than those shown in FIG. 1.

In some examples, the data receiving module 101 is configured to receive an image of a scene. The data receiving module can provide the image to the ATR module 102. In some examples, the ATR module is configured to perform an ATR on the image to detect objects in the image as candidate targets and divide the candidate targets into subsets of candidate targets. In some examples, the ATR module is configured to detect the objects in the image as the candidate targets using deep learning such as using convolutional neural networks.

To perform the ATR on the image, in some examples, the ATR module 102 is configured to detect the objects in the image as the candidate targets with respective confidence scores. In these examples, the ATR module is configured to divide the candidate targets into the subsets of candidate targets corresponding to different ranges of the confidence scores. A first subset of the subsets has a highest of the different ranges of the confidence scores. A higher range of confidence score may indicate a higher possibility that the candidate targets include true targets.

The ATR module 102 can provide the candidate targets to the verification module 103. In some examples, the verification module is configured to perform a verification of the ATR performed by the ATR module to identify true targets in the image. In these examples, the verification module is configured to present the image in the GUI 104. One subset at a time is indicated on the image in the GUI, sequentially beginning with and including at least the first subset of the subsets of candidate targets. For example, the verification module may at first present the image indicating the first subset of candidate targets in the GUI. At the next time, the verification module may present the image indicating another subset of candidate targets (e.g., with a lower range of confidence score) in the GUI.

To verify the ATR performed by the ATR module 102, in some examples, the verification module 103 is configured to receive user input via the GUI 104 for at least the first subset to verify those of the candidate targets in at least the first subset that are true targets, as indicated by arrow 105. For example, the verification module can receive user input to verify that a candidate target in the first subset is a true target. In these examples, the verification module is configured to remove from at least the first subset, those of the candidate targets in at least the first subset that are not true targets. For example, the verification module can remove a candidate target from the first subset of candidate targets after the user input indicates that the candidate target is not a true target.

The candidate targets detected by the ATR module 102 may include some true targets but not all the true targets in the image. In some examples, the verification module 103 is configured to solicit user input to manually identify remaining true targets in the image. The remaining true targets may be the true targets that are not included in the candidate targets. In some examples, the ATR module is configured to classify the objects as the candidate targets with respective classifications. In these examples, the verification module is configured to solicit further user input to classify the remaining true targets. For example, the verification module can solicit further user input to label or mark the remaining true targets as an object of interest, e.g., a true mine.

In some examples, the verification is performed according to a reinforcement learning process. The reinforcement learning process can minimize a total verification time. The reinforcement learning process includes an agent to interact with an environment of the GUI 104 and user input. The agent interacts with the environment in discrete steps. The discrete steps may involve agent states that correspond to respective ones of at least some of the subsets of candidate targets including the first subset. In each of the discrete steps, the agent is configured to choose a first action or a second action. The first action is to present the image in the GUI in which a current one of the subsets of candidate targets is identified on the image. The image is presented for receipt of user input via the GUI to verify those of the candidate targets in the current one of the subsets that are true targets. The second action is to solicit the user input to manually identify the remaining true targets in the image. A reward at each of the discrete steps is defined by a negative time for the first action or the second action chosen.

In some examples, the reinforcement learning process includes a Q-learning process, and the verification is performed using the Q-learning process to minimize the total verification time.

One advantage of the example implementations of the present disclosure is to achieve high accuracy of target detection. In some examples, the ATR performed by the ATR module 102 and the verification performed by the verification module 103 enable identification of all the true targets in the image. That is, the system 100 can achieve 100% accuracy of target detection in the image.

Figure 2A:
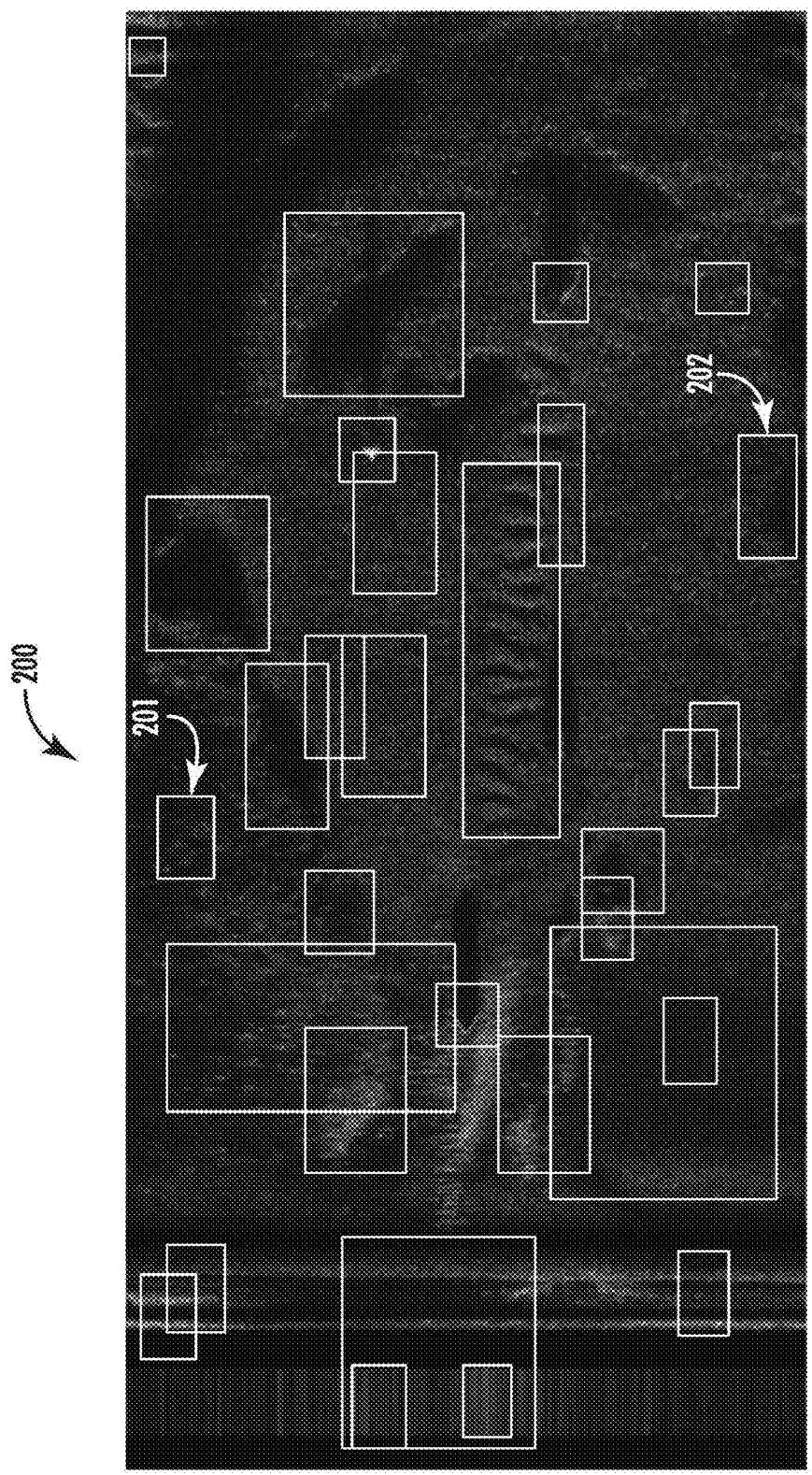
FIGS. 2A, 2B, 2C and 2D illustrate using the system in FIG. 1 for target detection, according to example implementations of the present disclosure.

FIGS. 2A, 2B, 2C and 2D illustrate using the system in FIG. 1 for target detection, according to example implementations of the present disclosure. FIG. 2A illustrates an image 200 of a scene such as a seabed. The ATR module 102 can perform an ATR on the image to detect objects in the image as candidate targets such as candidate mines in the seabed. As shown in FIG. 2A, in one example, each of the bounding boxes (e.g., bounding boxes 201 and 202) in the image can indicate a candidate mine in the seabed. The ATR module can divide the candidate targets into subsets of candidate targets, as described above.

Figure 2B:
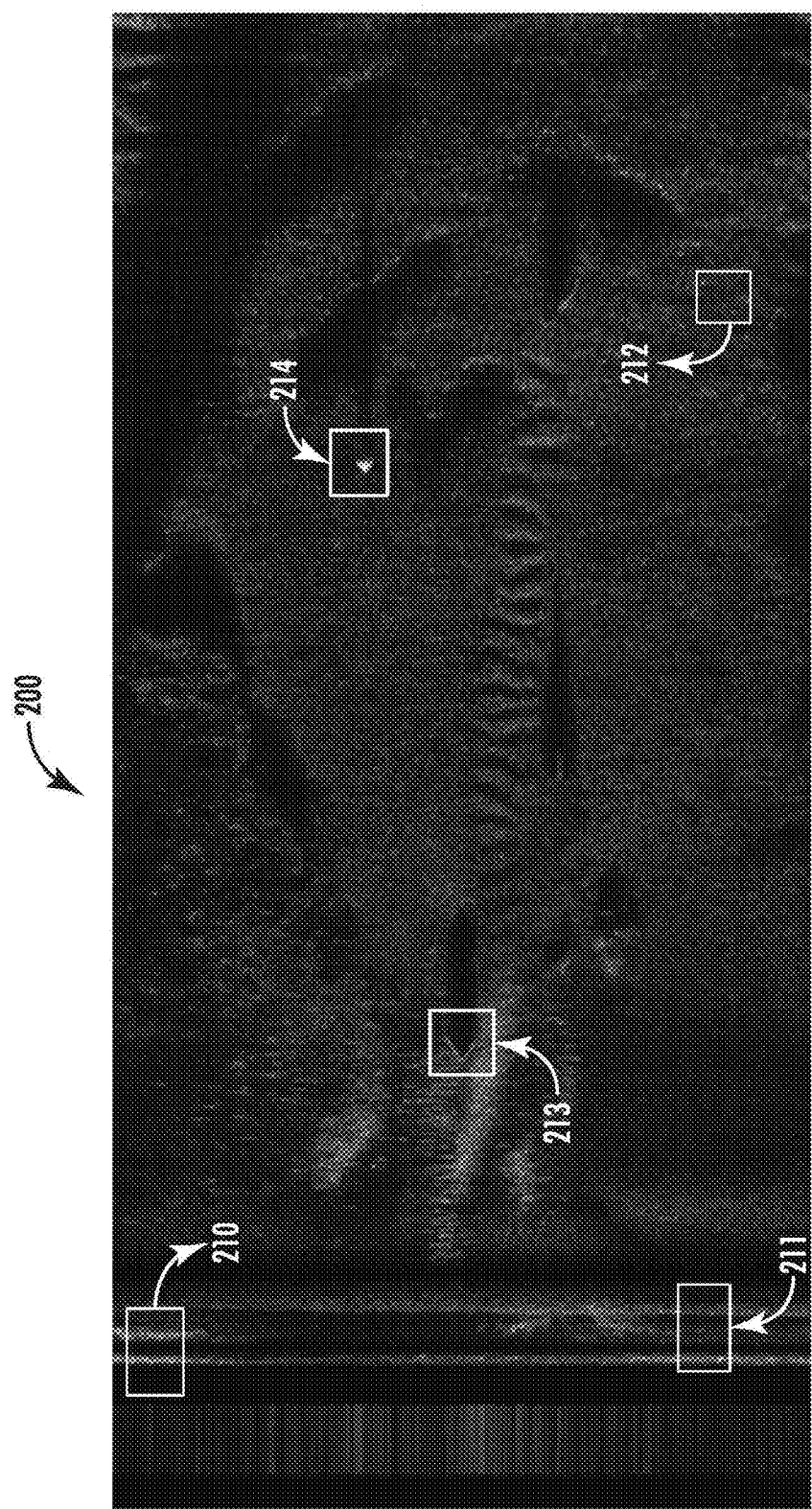

In one example, the verification module 103 can perform a verification of the ATR to identify true targets in the image 200. For example, the verification module can present the image in the GUI 104. One subset at a time is indicated on the image in the GUI, sequentially beginning with and including a first subset of the subsets of candidate targets. As shown in FIG. 2B, the verification module can at first present the image in the GUI 104 indicating a first subset including five candidate mines 210, 211, 212, 213 and 214. The first subset may have a highest range of confidence score, as described above. The number of candidate targets in each subset can be selected to allow the user to accurately identify true targets.

In the above example shown in FIG. 2B, the verification module 103 can receive user input via the GUI 104 to verify those of the candidate targets in the first subset that are true targets. For example, the verification module can receive user input indicating that candidate mines 213 and 214 are true mines. In this example, the verification module can also receive user input indicating that candidate mines 210-212 are not true mines, and remove candidate mines 210-212 from the first subset. The user can label or mark candidate mines 213 and 214 as true mines.

Figure 2C:
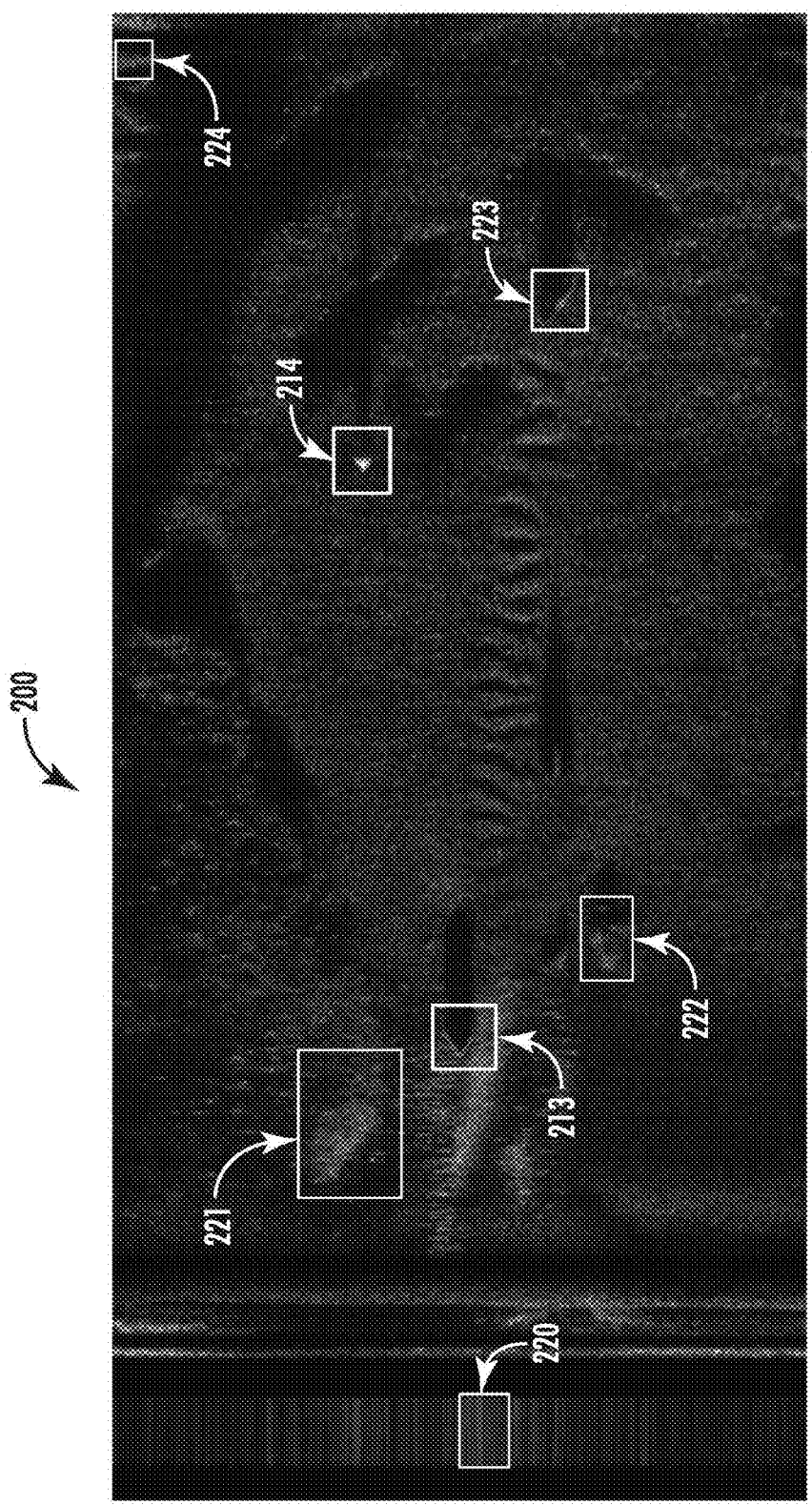

In one example, after identifying the true targets in the first subset, the verification module 103 may determine to continue to verify the candidate targets provided by the ATR module 102 to identify remaining true targets in the image 200. As shown in FIG. 2C, the identified true mines 213 and 214 can be still presented in the image via the GUI 104. However, the candidate mines 210-212 in the first subset that are not true mines may not be presented in the image via the GUI. In this example, as shown in FIG. 2C, at a next time, the ATR can present the image in the GUI indicating a second subset of candidate targets including five candidate mines 220, 221, 222, 223 and 224. The second subset of candidate targets may have a second highest range of confidence score.

In the above example shown in FIG. 2C, the verification module 103 can receive user input via the GUI 104 to verify those of the candidate targets in the second subset that are true targets. For example, the verification module can receive user input indicating that candidate mine 223 is a true mine. In this example, the verification module can also receive user input indicating that candidate mines 220-222 and 224 are not true mines, and remove candidate mines 220-222 and 224 from the second subset.

Figure 2D:
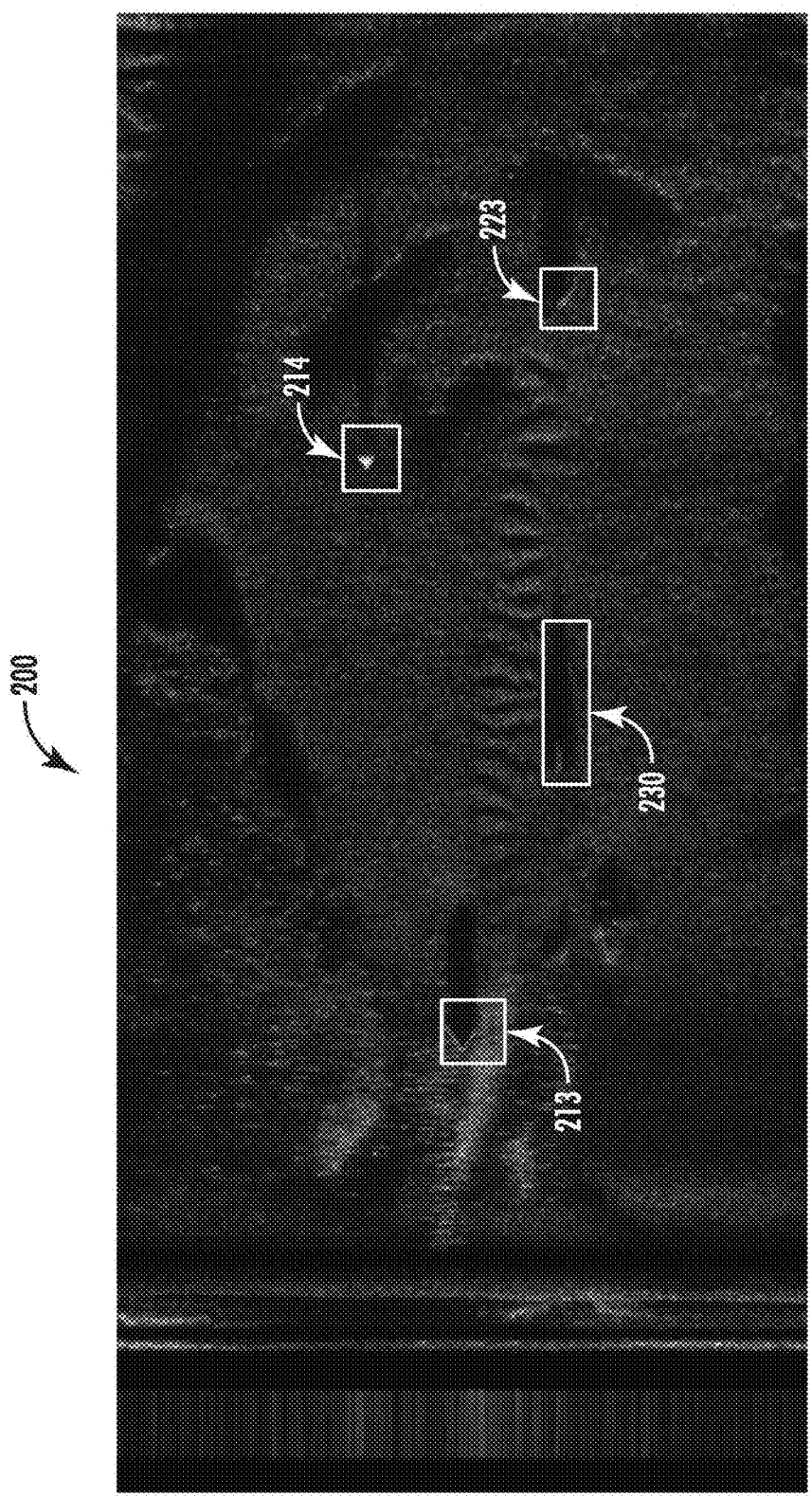

In one example, after identifying the true targets in the second subset, the verification module 103 may determine not to continue to verify the candidate targets provided by the ATR module 102 to identify remaining true targets in the image 200. One reason maybe that the remaining subsets of candidate targets may have a range of confidence score lower than a threshold. Instead, the verification module can determine to solicit user input to manually identify remaining true targets in the image. As shown in FIG. 2D, the identified true mines 213, 214 and 223 can be still presented in the image via the GUI 104. However, the verification module may not present another subset of candidate targets (e.g., a third subset with an even lower range of confidence score) in the image via the GUI 104. Instead, the verification module can solicit user input to manually identify a remaining true mine 230 in the image. The true mine 230 may not be included in the candidate targets provided by the ATR module.

In one example, during the verification, if the user determines that all true targets have been identified, the user can accept the result and ignore the remaining subsets of candidate targets. On the other hand, the verification module 103 has an option to ask the user to manually identify the remaining true targets, if the verification module expects that this is a faster option. Finding the optimal strategy of collaboration between the system 100 and the user to minimize the total verification time can be formulated as a reinforcement learning process. For example, for one image, the ATR module 102 can be an agent that interacts with an environment of the GUI 104 and user input. Agent states can be characterized by the output of the ATR module and the current subset of candidate targets. The agent states may correspond to respective ones of at least some of the subsets of candidate targets including the above described first subset.

In one example of the reinforcement learning process, in each state, the agent may have a choice of two possible actions. The first action can present the current subset of candidate targets and ask the user to identify true targets in the current subset and correct their classification if needed. The second action can stop presenting subsets of candidate targets but solicit the user input for manual labeling and drawing of boxes around all remaining true targets in the image.

In one example, the reinforcement learning process can be performed in discrete steps. The reward at every discrete step can be the negative time required for the chosen first or second action. The first action may cost less time and therefore have a higher reward than the second action. If the first action does not result in identification of all true targets, the verification module 103 in the next state may present a next subset with the next lower range of confidence score. At each step, the verification module may need to decide whether to choose the second action or take a series of the first actions that may or may not result in identification of all true targets. One possible scenario for the verification of an image may include choosing a sequence of the first actions. Another possible scenario for the verification may include choosing a sequence of the first actions followed by a second action. A third possible scenario for the verification may include directly choosing the second action. The total return can be the sum of rewards over all the discrete steps. Reinforcement learning can allow the agent to learn the optimal policy or strategy to select one of the two actions in each discrete step that maximizes the return, which minimizes the total verification time.

In one example, the agent can learn the optimal policy from trial and error interactions with the environment. The initial policy can be trained on a training set, and can be further improved during interaction with the user during a target detection task. The reinforcement learning process can learn a policy with a Q-learning process. The Q-learning process can learn to iteratively approximate a Q-function Q (a, s) that indicates what return or reward that the agent should expect at state s after taking action a. Once the Q-function is determined, the optimal strategy can be to pick the action with the highest Q-value (e.g. the maximized return or the minimized total verification time).

Figure 3:
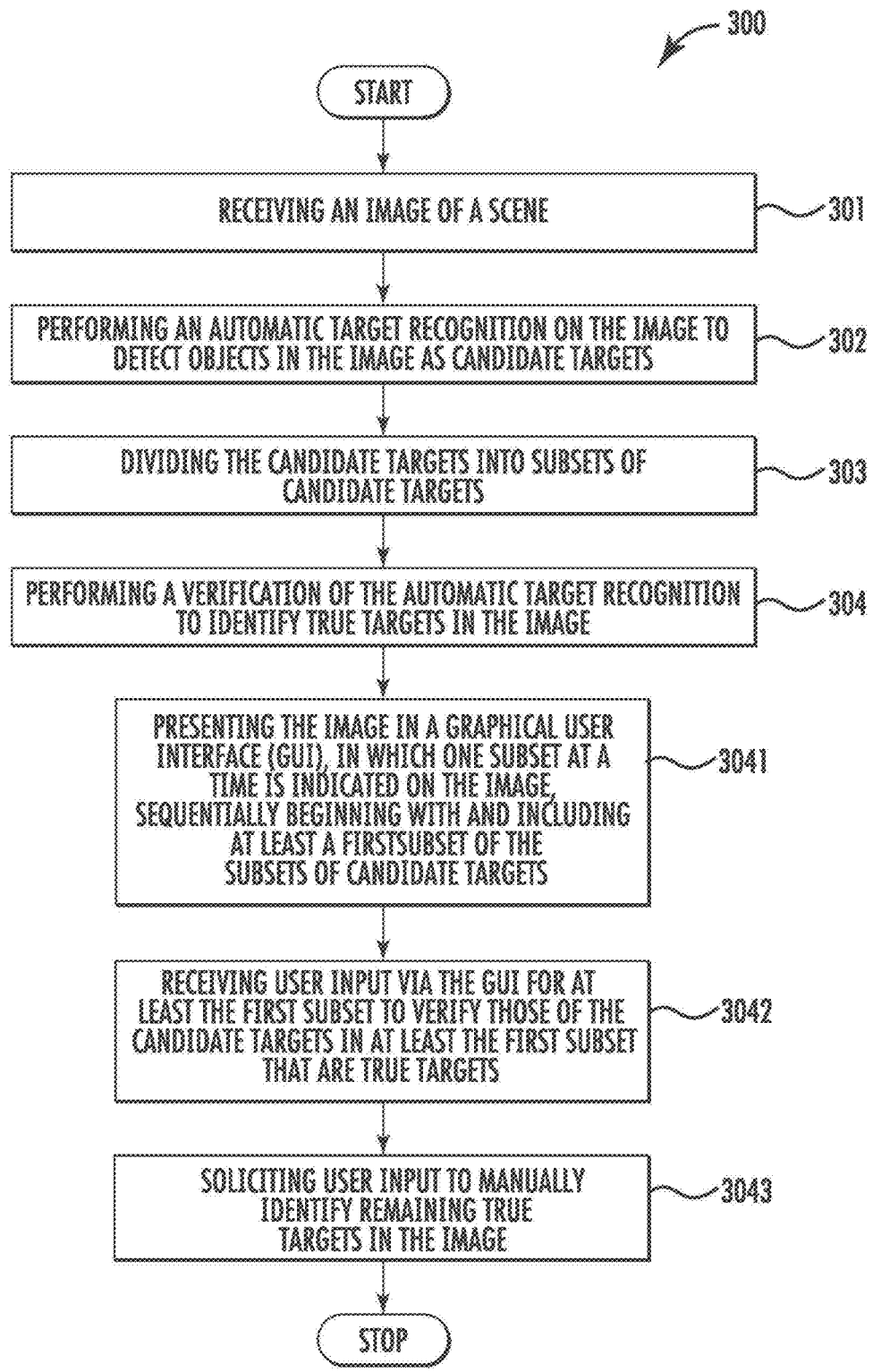
FIG. 3 illustrates a flowchart of various operations in a method of automatic target recognition with reinforcement learning, according to example implementations of the present disclosure.

FIG. 3 illustrates a flowchart of various operations in a method 300 of ATR with reinforcement learning, according to example implementations of the present disclosure. As shown, at block 301, the method includes receiving an image of a scene. At block 302, the method includes performing an ATR on the image to detect objects in the image as candidate targets. At block 303, the method includes dividing the candidate targets into subsets of candidate targets.

At block 304, the method 300 includes performing a verification of the ATR to identify true targets in the image. In one example, the operation at block 304 can be further divided into three steps as shown in sub-blocks 3041, 3042 and 3043. At sub-block 3041, the method includes presenting the image in the GUI 104. One subset at a time is indicated on the image in the GUI, sequentially beginning with and including at least a first subset of the subsets of candidate targets. At sub-block 3042, the method includes receiving user input via the GUI for at least the first subset to verify those of the candidate targets in at least the first subset that are true targets. At sub-block 3043, the method includes soliciting user input to manually identify remaining true targets in the image.

In some examples, the verification in the method 300 is performed according to a reinforcement learning process. The reinforcement learning process includes an agent to interact with an environment of the GUI 104 and user input. The agent interacts with the environment in discrete steps. In each of the discrete steps, the agent is configured to choose a first action or a second action. The first action is to present the image in the GUI in which a current one of the subsets is identified. The image is presented for receipt of user input via the GUI to verify those of the candidate targets in the current one of the subsets that are true targets. The second action is to solicit the user input to manually identify the remaining true targets in the image. A reward at each of the discrete steps is defined by a negative time for the first action or the second action chosen.

According to example implementations of the present disclosure, the system 100 and its subsystems including the data receiving module 101, ATR module 102, verification module 103 and GUI 104 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
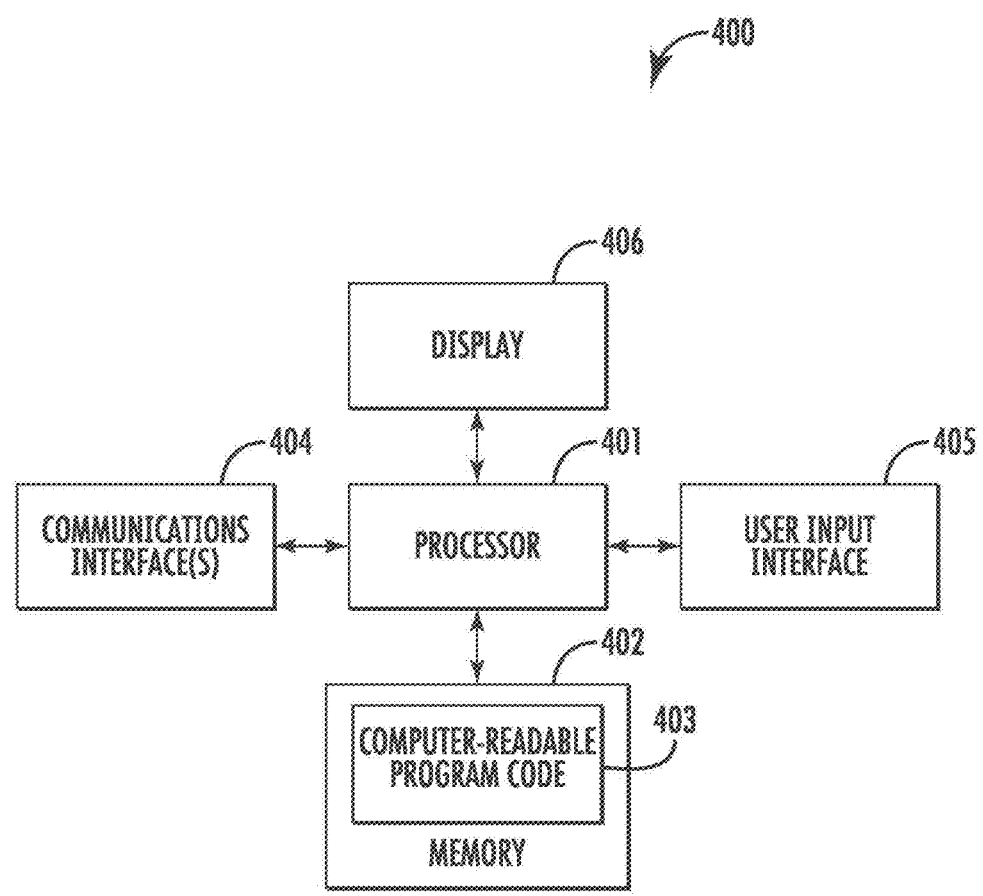
FIG. 4 illustrates an apparatus according to some example implementations.

FIG. 4 illustrates an apparatus 400 according to some example implementations. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 401 (e.g., processing circuitry) connected to a memory 402 (e.g., storage device). In some examples, the apparatus 400 implements the system 100.

The processor 401 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 402 (of the same or another apparatus).

The processor 401 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 402 is generally any piece of computer hardware that is capable of storing information such as, for example, data, computer programs (e.g., computer-readable program code 403) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 402, the processor 401 may also be connected to one or more interfaces for displaying, transmitting and/or receiving information. The interfaces may include a communications interface 404 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 406 and/or one or more user input interfaces 405 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, keyboard or keypad, joystick, touch-sensitive surface (separate from or integrated into a touchscreen), biometric sensor or the like. The user interfaces may further include one or more interfaces for communicating with peripherals such as printers, scanners or the like. In some examples, the user interfaces include the GUI 104.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 401 and a computer-readable storage medium or memory 402 coupled to the processor, where the processor is configured to execute computer-readable program code 403 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for automatic target recognition with reinforcement learning, the apparatus comprising a processor and a memory storing executable instructions that, in response to execution by the processor, cause the apparatus to:
   receive an image of a scene;
   perform an automatic target recognition on the image to detect objects in the image as candidate targets;
   divide the candidate targets into subsets of candidate targets, wherein the subsets of candidate targets correspond to different ranges of confidence scores and comprise pluralities of candidate targets;
   perform a verification of the automatic target recognition to identify true targets in the image, including the apparatus being caused to:
      present the image in a graphical user interface (GUI), in which one subset at a time is indicated on the image, sequentially beginning with and including at least a first subset of the subsets of candidate targets;
      receive user input via the GUI for at least the first subset to verify those of the candidate targets in at least the first subset that are true targets; and
      solicit user input to manually identify remaining true targets in the image,
   wherein the verification is performed according to a reinforcement learning process including an agent to interact with an environment of the GUI and user input in discrete steps, in each of the discrete steps the agent configured to choose a first action to present the image in the GUI in which a current one of the subsets is identified, for receipt of user input via the GUI to verify those of the candidate targets in the current one of the subsets that are true targets, or a second action to solicit the user input to manually identify the remaining true targets in the image, a reward at each of the discrete steps defined by a negative time for the first action or the second action chosen.

2. The apparatus of claim 1, wherein the apparatus being caused to perform the automatic target recognition further includes being caused to classify the objects as the candidate targets with respective classifications, and
   wherein the apparatus being caused to solicit user input to manually identify the remaining true targets in the image includes being caused to solicit further user input to classify the remaining true targets.

3. The apparatus of claim 1, wherein the apparatus being caused to perform the automatic target recognition includes being caused to detect the objects in the image as the candidate targets with respective confidence scores, and
   wherein the apparatus being caused to divide the candidate targets into the subsets of candidate targets corresponding to different ranges of the confidence scores comprises the first subset having a highest of the different ranges of the confidence scores.

4. The apparatus of claim 1, wherein the apparatus being caused to perform the automatic target recognition includes being caused to detect the objects in the image as the candidate targets using deep learning.

5. The apparatus of claim 1, wherein the apparatus being caused to receive user input further includes being caused to remove from at least the first subset, those of the candidate targets in at least the first subset that are not true targets.

6. The apparatus of claim 1, wherein the reinforcement learning process includes a Q-learning process, and the verification is performed using the Q-learning process to minimize the total verification time.

7. The apparatus of claim 1, wherein the apparatus being caused to perform the automatic target recognition and verification enables identification of all the true targets in the image.

8. A method of automatic target recognition with reinforcement learning, the method comprising:
   receiving an image of a scene;
   performing an automatic target recognition on the image to detect objects in the image as candidate targets;
   dividing the candidate targets into subsets of candidate targets, wherein the subsets of candidate targets correspond to different ranges of confidence scores and comprise pluralities of candidate targets;
   performing a verification of the automatic target recognition to identify true targets in the image, including:
      presenting the image in a graphical user interface (GUI), in which one subset at a time is indicated on the image, sequentially beginning with and including at least a first subset of the subsets of candidate targets;
      receiving user input via the GUI for at least the first subset to verify those of the candidate targets in at least the first subset that are true targets; and
      soliciting user input to manually identify remaining true targets in the image,
   wherein the verification is performed according to a reinforcement learning process including an agent to interact with an environment of the GUI and user input in discrete steps, in each of the discrete steps the agent configured to choose a first action to present the image in the GUI in which a current one of the subsets is identified, for receipt of user input via the GUI to verify those of the candidate targets in the current one of the subsets that are true targets, or a second action to solicit the user input to manually identify the remaining true targets in the image, a reward at each of the discrete steps defined by a negative time for the first action or the second action chosen.

9. The method of claim 8, wherein performing the automatic target recognition further includes classifying the objects as the candidate targets with respective classifications, and wherein soliciting user input to manually identify the remaining true targets in the image includes soliciting further user input to classify the remaining true targets.

10. The method of claim 8, wherein performing the automatic target recognition includes detecting the objects in the image as the candidate targets with respective confidence scores, and wherein dividing the candidate targets into the subsets of candidate targets corresponding to different ranges of the confidence scores comprises the first subset having a highest of the different ranges of the confidence scores.

11. The method of claim 8, wherein performing the automatic target recognition includes detecting the objects in the image as the candidate targets using deep learning.

12. The method of claim 8, wherein receiving user input further includes removing from at least the first subset, those of the candidate targets in at least the first subset that are not true targets.

13. The method of claim 8, wherein the reinforcement learning process includes a Q-learning process, and the verification is performed using the Q-learning process to minimize the total verification time.

14. The method of claim 8, wherein performing the automatic target recognition and verification enables identification of all the true targets in the image.

15. A computer-readable storage medium for automatic target recognition with reinforcement learning, the computer-readable storage medium being non-transitory and having computer-readable program code stored therein that in response to execution by a processor, causes an apparatus to:

receive an image of a scene;

perform an automatic target recognition on the image to detect objects in the image as candidate targets;

divide the candidate targets into subsets of candidate targets, wherein the subsets of candidate targets correspond to different ranges of confidence scores and comprise pluralities of candidate targets;

perform a verification of the automatic target recognition to identify true targets in the image, including the apparatus being caused to:

present the image in a graphical user interface (GUI), in which one subset at a time is indicated on the image, sequentially beginning with and including at least a first subset of the subsets of candidate targets;

receive user input via the GUI for at least the first subset to verify those of the candidate targets in at least the first subset that are true targets; and solicit user input to manually identify remaining true targets in the image, wherein the verification is performed according to a reinforcement learning process including an agent to interact with an environment of the GUI and user input in discrete steps, in each of the discrete steps the agent configured to choose a first action to present the image in the GUI in which a current one of the subsets is identified, for receipt of user input via the GUI to verify those of the candidate targets in the current one of the subsets that are true targets, or a second action to solicit the user input to manually identify the remaining true targets in the image, a reward at each of the discrete steps defined by a negative time for the first action or the second action chosen.

16. The computer-readable storage medium of claim 15, wherein the apparatus being caused to perform the automatic target recognition further includes being caused to classify the objects as the candidate targets with respective classifications, and wherein the apparatus being caused to solicit user input to manually identify the remaining true targets in the image includes being caused to solicit further user input to classify the remaining true targets.

17. The computer-readable storage medium of claim 15, wherein the apparatus being caused to perform the automatic target recognition includes being caused to detect the objects in the image as the candidate targets with respective confidence scores, and wherein the apparatus being caused to divide the candidate targets into the subsets of candidate targets corresponding to different ranges of the confidence scores comprises the first subset having a highest of the different ranges of the confidence scores.

18. The computer-readable storage medium of claim 15, wherein the apparatus being caused to perform the automatic target recognition includes being caused to detect the objects in the image as the candidate targets using deep learning.

19. The computer-readable storage medium of claim 15, wherein the apparatus being caused to receive user input further includes being caused to remove from at least the first subset, those of the candidate targets in at least the first subset that are not true targets.

20. The computer-readable storage medium of claim 15, wherein the reinforcement learning process includes a Q-learning process, and the verification is performed using the Q-learning process to minimize the total verification time.

21. The computer-readable storage medium of claim 15, wherein the apparatus being caused to perform the automatic target recognition and verification enables identification of all the true targets in the image.

* * * * *